United States Patent
Junuzovic et al.

(10) Patent No.: US 7,624,145 B2
(45) Date of Patent: Nov. 24, 2009

(54) PERSISTENT COLLABORATIVE FRAMEWORK FOR INTERACTIVE WEB APPLICATIONS

(75) Inventors: Sasa Junuzovic, Carrboro, NC (US); Rajesh Hegde, Redmond, WA (US); Li-wei He, Redmond, WA (US); Zhengyou Zhang, Bellevue, WA (US); Steven Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 11/620,658

(22) Filed: Jan. 6, 2007

(65) Prior Publication Data

US 2008/0168139 A1 Jul. 10, 2008

(51) Int. Cl.
*G06F 15/16* (2006.01)
*G06F 15/173* (2006.01)
*G06F 15/177* (2006.01)

(52) U.S. Cl. .......................... 709/205; 717/140; 707/1
(58) Field of Classification Search ......... 709/200–205, 709/217–228; 707/1, 10, 100; 717/140
See application file for complete search history.

(56) References Cited

U.S. PATENT DOCUMENTS

| | | | |
|---|---|---|---|
| 2005/0049994 A1* | 3/2005 | Thompson et al. ............. | 707/1 |
| 2005/0050054 A1* | 3/2005 | Clark et al. ................. | 707/100 |
| 2006/0161554 A1* | 7/2006 | Lucovsky et al. ............. | 707/10 |
| 2007/0174428 A1* | 7/2007 | Lev Ran et al. ............. | 709/218 |
| 2007/0220497 A1* | 9/2007 | Chudukatil et al. ......... | 717/140 |

OTHER PUBLICATIONS

Whitehead, J. and M. Wiggins, WEBDAV: IEFT standard for collaborative authoring on the web, IEEE Internet Commputing, Sep./Oct. 1998, pp. 34-40.
Ajax, developer.mozilla.org/en/docs/AJAX, last accessed Jan. 29, 2007, Mozilla Foundation, Mountain View, CA, p. 1.
Dewan, P. and R. Choudhary, A high-level and flexible framework for implementing multiuser user interfaces, ACM Transactions on Information Systems, Oct. 1992, vol. 10, No. 4, pp. 345-380, ACM, New York, NY, USA, p. 1.
Google Docs & Spreadsheets, docs.google.com, last accessed Jan. 8, 2007, Google Inc., Mountain View, CA, p. 1.
Google Talk, www.google.com/talk, last accessed Jan. 8, 2007, Google Inc., Mountain View, CA. p. 1.
Google Web Toolkit, code.google.com/webtoolkit, last accessed Jan. 8, 2007, Google Inc., Mountain View, CA, p. 1.
Ellis, C. A., and S. J. Gibbs, Concurrency control in groupware systems, Proceedings of the 1989 ACM SIGMOD Int'l Conf. on Management of Data, Jun. 1989, vol. 18, No. 2, pp. 399-407, ACM, New York, NY, USA, p. 1.

(Continued)

*Primary Examiner*—Haresh N Patel
(74) *Attorney, Agent, or Firm*—Lyon & Harr, LLP; Richard T. Lyon

(57) ABSTRACT

A framework for facilitating collaborative interaction between users of a web application is presented. The framework provides persistence and sharing mechanisms for arbitrary application-defined objects. The sharing mechanism is coupled with a consistency mechanism that keeps client states consistent even when users perform conflicting operations. This framework is application-independent in that the persistence, sharing between clients and maintaining a consistent state among the clients is accomplished without the need for specific knowledge of the design of the web application. Thus, web developers can focus on the logic of the application and the UI, instead of spending time designing and implementing collaborative capabilities.

18 Claims, 9 Drawing Sheets

OTHER PUBLICATIONS

Ebuddy, ebuddy.com, last accessed Jan. 8, 2007, eBuddy, Amsterdam, p. 1.

Meebo, meebo.com, last accessed Jan. 8, 2007, Meebo Inc., Mountain View, CA, p. 1.

Adam Fass, Messyboard, messyboard.org, last accessed Jan. 8, 2007, p. 1.

Microsoft Asp.Net Ajax, ajax.asp.net, last accessed Jan. 8, 2007, Microsoft Corporaton, Redmond, WA, p. 1.

Microsoft Sharepoint, microsoft.com/sharepoint, last accessed Jan. 29, 2007, Microsoft Corporation, Redmond, WA, p. 1.

MSN Web Messenger, webmessenger.msn.com, last accessed Jan. 8, 2007, Microsoft Corporation, Redmond, WA, p. 1.

Munson, J. P., and P. Dewan, Sync: A Java framework for mobile collaborative applications, Computer, pp. 59-66, vol. 30, No. 6, Jun. 1997, IEEE Computer Society, Washington D.C., USA.

Roseman, M., and S. Greenberg, Building real-time groupware with GroupKit, a groupware toolkit, ACM Transactions on Computer-Human Interaction, Mar. 1996, pp. 66-106, vol. 3, No. 1, ACM, New York, NY, USA.

Roussev, V., and P. Dewan, Composable collaboration infrastructures based on programming patterns, ACM 2000 Conference on Computer Supported Cooperative Work, Dec. 2000, pp. 117-126, ACM, New York, NY, USA.

SubEthaEdit, codingmonkeys.de/subethaedit, last accessed Jan. 8, 2007, TheCodingMonkeys, p. 1.

Sun, C., and C. Ellis, Operational transformation in real-time group editors: Issues, algorithms, and achievements, ACM Conference on Computer Supported Cooperative Work, Nov. 14-18, 1998, ACM, New York, NY, USA, p. 1.

\* cited by examiner

PERSISTENT COLLABORATIVE FRAMEWORK FOR INTERACTIVE WEB APPLICATIONS

BACKGROUND

The Internet has become a world-wide collaboration environment. Collaborative applications ranging from rich clients to web applications, have tapped into this environment to offer a variety of services to users. Until recently, only rich clients and applets offered high user interactivity. In particular, traditional web applications did not provide good response times to users' actions, which in turn, reduced their interactivity. They suffered poor response times for three reasons. First, because all user requests are processed by the server, the response time for a request included the round-trip time to the server. Second, the requests to the server were made in a synchronous fashion, which blocked the user from performing further actions until the response from the server was received and processed. Finally, any response from the server required a full page refresh.

Recently, some interactive web applications have appeared which do provide a high degree of user interactivity. For example, one such application persists users' changes, so that when these or other users view a page of the application, they will all see the latest version. In addition, when multiple users edit the same page concurrently, each user can see the changes made by other users. This is called synchronous sharing. Synchronous sharing, in turn, requires that users' views are kept consistent even when users make conflicting changes. However, all these applications rely on proprietary solutions for each requirement. As a result, to satisfy these requirements, the developers of new interactive web applications have to "reinvent the wheel" repeatedly.

SUMMARY

An application-independent framework for facilitating collaborative interaction between users of a web application is provided to assist web developers in creating such applications. The framework is application independent in that persistence, sharing between users and maintaining a consistent state among the users is accomplished without the need for specific knowledge of the design of the web application. Thus, web developers can focus on the logic of the application and the UI, instead of spending time designing and implementing collaborative capabilities.

The present technique employs a server-client based scheme. The web application respectively runs on a client associated with each user. A client-side library on each client interfaces with the application and communicates with a server. For the purposes of this summary and the description to follow, the term client will be used to mean the client as a whole including both the client application and the client-side library. In some instances it is appropriate to note whether the client application or the client-side library is responsible for a specific action. In such cases, the application or library will be called out specifically.

The server is generally charged with overseeing the replication of the current state of the application on each client at the time the client joins a collaborative session of the application being conducted amongst a group of clients. In addition, the server is involved with persisting changes to the application received from the client-side library of the individual clients, and maintaining consistent application state across all the clients. As indicated previously, this replication, persistence and consistency maintenance are accomplished independent of the application.

More particularly, in one embodiment of the present framework each client first sends a request to the server to log into a session of the web application. This request generally includes the user's name and identifies the session the user wants to join. The server determines if the request is valid and from an authorized client, and it checks to see if the desired session will be a new one or an ongoing one. If it is a new one, the server creates the session using a user/application-specified name. The server then sends the client-side library of the requesting client both a client identification token and session token. The client identification token uniquely identifies the client and the session token identifies the session. These tokens are included in all future communications from the client to the server, so that the server will know what client and what session the communication concerns. The client-side library next sends an initial update poll to the server requesting an update to place the application running on the client in a current state. This initial update poll also includes a timestamp having a value of zero to indicate the poll is the first made by the client-side library in the session. In response, the server sends the polling client-side library a set of tuples that define the current state of the application, if the session is an ongoing one. A tuple is an ordered list of N elements, each of a prescribed type. Each tuple defines a current value of a property of an object of the application where the application is characterized as a group of objects with each object comprising a set of properties. In a case where the session is new, no tuples are sent as the initial state of the application running on the client is considered the current state. In either case, however, the server sends an updated timestamp to the polling client-side library in response to the initial update poll. The timestamp has a value representing when the response to the update poll was sent. The client-side library caches the updated timestamp, and if tuples were sent, passes them on to the application for implementation.

Once a client is logged on and its application is updated to the current state, each time a change is made to a property of one of the objects of the application that the application wants to persist and/or share, the client application generates a tuple defining the change and the client-side library sends it to the server. It is noted that the application running on the client implements the change immediately. Server permission is not required. Upon receiving a tuple from a client-side library, the server persists the tuple in its database.

Periodically, the client-side library sends an update poll to the server requesting an update to the state of the application. This poll includes the last cached timestamp, as well as the aforementioned tokens. In response to an update poll received from the client-side library, the server returns tuples that were persisted after the time represented by the received timestamp, or which were not previously sent to the polling library but have become available for dissemination. In addition, the server includes an updated timestamp. The client-side library caches the updated timestamp and passes the tuples on to the client application for implementation.

It is noted that while the foregoing limitations in existing interactive web applications described in the Background section can be resolved by a particular implementation of a persistent collaborative framework for interactive web applications according to the present invention, this is in no way limited to implementations that just solve any or all of the noted disadvantages. Rather, the present framework has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present persistent collaborative framework for interactive web applications, a brief, general description of a suitable computing environment in which portions thereof may be implemented will be described. The present framework is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
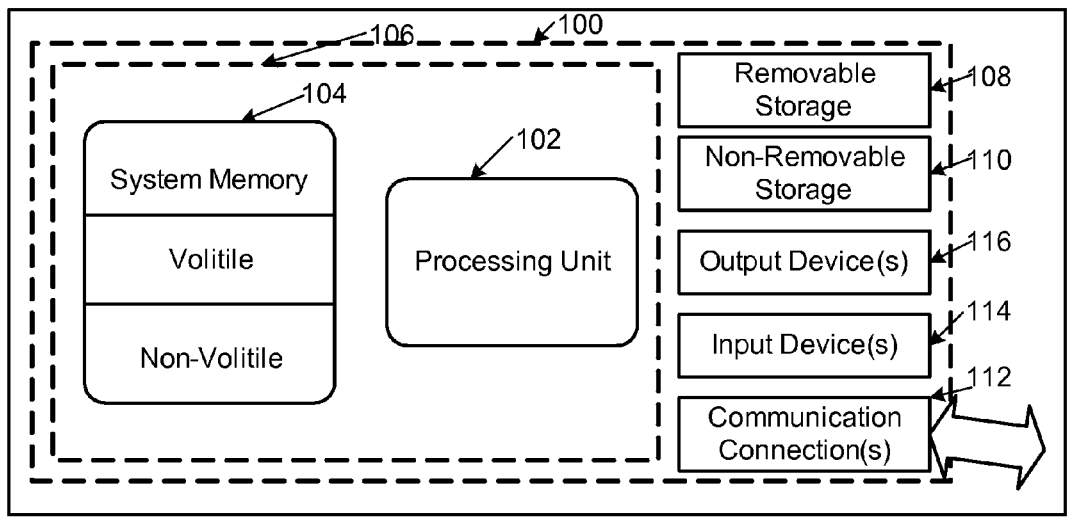
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present framework. Neither should the computing environment be interpreted as having any dependency or requirement relating to any one or combination of components illustrated in the exemplary operating environment. With reference to FIG. 1, an exemplary system for implementing the present framework includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, camera, etc. Output device(s) 116 such as a display, speakers, printer, etc. may also be included. All these devices are well known in the art and need not be discussed at length here.

The present framework may be described in the general context of computer-executable instructions, such as program modules, being executed by a computing device. Generally, program modules include routines, programs, objects, components, data structures, etc. that perform particular tasks or implement particular abstract data types. The present framework may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present framework.

2.0 The Persistent Collaborative Framework for Interactive Web Applications

The present persistent collaborative environment for interactive web applications provides persistence and sharing mechanisms for arbitrary application-defined objects. The sharing mechanism is coupled with a consistency mechanism that keeps client states consistent even when users perform conflicting operations. In addition, the framework maintains the interactivity of the web application at all times. The following sections provide descriptions of various embodiments of the present framework starting with its architecture and then its operations.

2.1 Architecture

Figure 2:
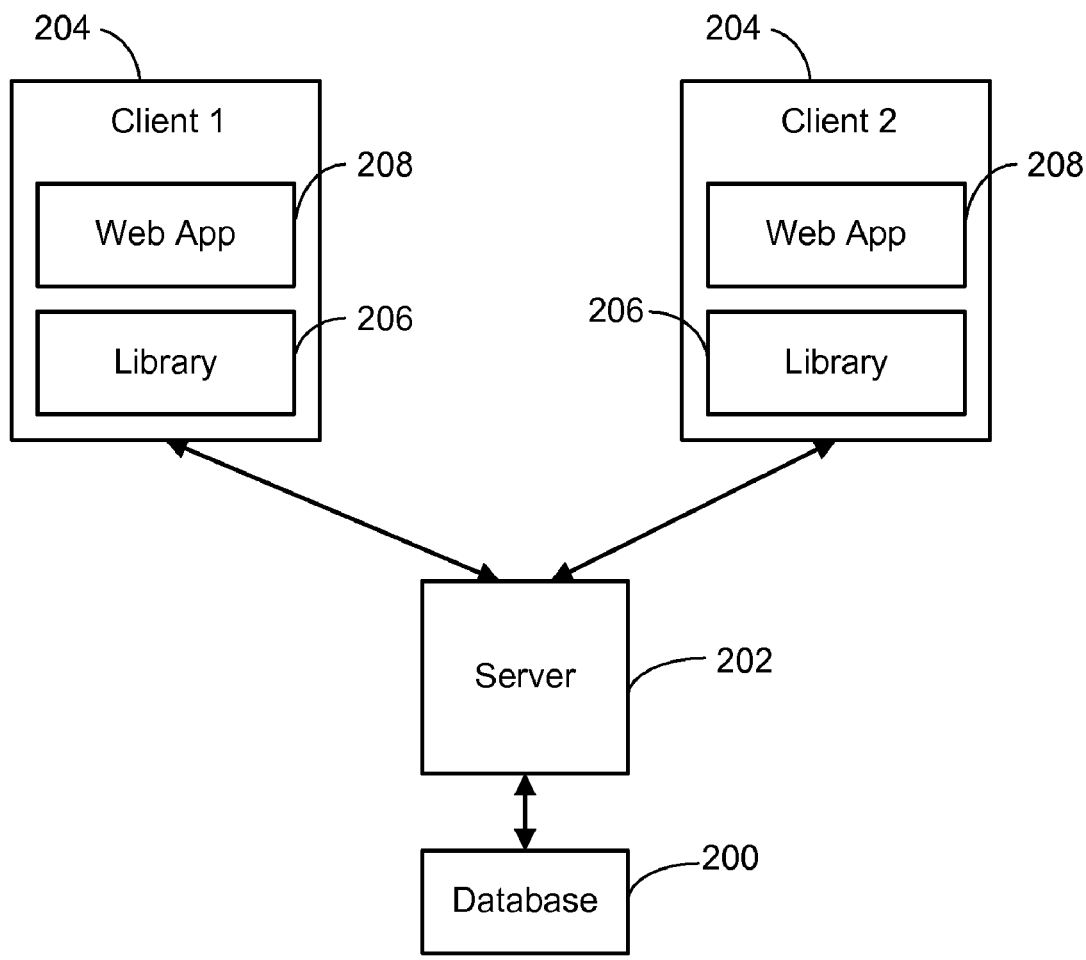
FIG. 2 is a block diagram illustrating the general architecture of an application-independent framework for facilitating collaborative interaction between users of a web application.

The present persistent collaborative framework for interactive web applications is a client-server based scheme. Its architecture is shown in simplified form in FIG. 2. At heart is a database 200. The main role of the database 200 is to store updates from clients, as will be described later. The server 202 has two main roles. First, it controls access to the database 200. For example, it is responsible for ensuring that the data from a client 204 is stored in the database. Second, it is responsible for keeping all the clients 204 in sync. For instance, it propagates updates from one client 204 to all the other clients. It is noted that while just two clients 204 are shown in FIG. 2 for the sake of simplicity, there could be many more.

As is typical of a web server, a new server instance processes each service request from a client. As a result, the server 202 instances do not maintain any state in memory. Instead, the database 200 is used to store client updates, while the caller of the service is responsible for maintaining any context the server 202 includes in the response. For example, such context includes login tokens, which the server 202 sends in response to login calls. These tokens help a future server process recognize a client 204. To remove the burden of maintaining such context from the web application programmer, the present framework provides a client-side library 206 for each client 204 to maintain this context, as shown in FIG. 2. Thus, for example, the client-side library 206 would include the aforementioned client identification token with all data sent to the server 202, so that the server can recognize the data as coming from a legitimate client 204. Each client 204 also has a copy of the web application 208, which interacts with the server 202 through the client-side library 206. The library 206 exposes an API, which includes function calls for login and logout, persisting and sharing updates, and update polling.

The server 202 persists and shares data on a per session basis. Thus, each client 204, via its library 206, must either create a new session or log into an existing one. Each session is assigned a name, which can be user/application provided, implicitly inherited from a URL associated with the client application 208, or established in some other appropriate manner. Regardless, if the session is new, the server 202 creates a new session. On the other hand, if the session was previously created, then the server 202 assumes that the user wants to load the current data for the session. The server 202 sends session tokens, which like the login tokens, are a part of the context cached by the client-side library 206, and included in data sent to the server so that the server can identify the session to which the data applies.

Another aspect of the client-side library 206 is that it does not reduce the interactivity of the client application 208. In fact, before a client application 208 sends an update to the library 206, it first executes the update locally. In addition, the library 206 makes asynchronous web-service calls to the server 202 so the user is never blocked waiting for a response from the server. Thus, when a user performs an action, the result is immediately shown to the user, even though the server 202 may not have processed it yet. In addition, as the updates are property-based (as will be described shortly), the client application 208 can process updates when it receives them from the client-side library 206 without the full page refreshes typical of past web applications.

As will be described more fully later, the server 202 sends updates to the client application 208 that were made by a user to the client-side library 206 associated with each of the other clients 204. Because the interactive application is web-based and HTTP is a connection-less protocol, there is no easy way for the server 202 to push information to the client 204. As a result, the client-side library 206 is responsible for sending periodic polls the server 202 requesting available updates.

By hooking into the client-side library 206 through a minimal API set, web application developers can focus on developing the business logic and the application UI. In particular, the web application developers do not have to worry about managing communication between the client application 208 and the server 202 or between different clients 204. Moreover, the server 202 provides all session persistence, so this need not be dealt with at the application level. Finally, the application developer does not have to worry about maintaining a consistent state across the clients 204, this is handled by the server 202 and client-side libraries 206.

2.2 Server-Client Operations

Figure 3:
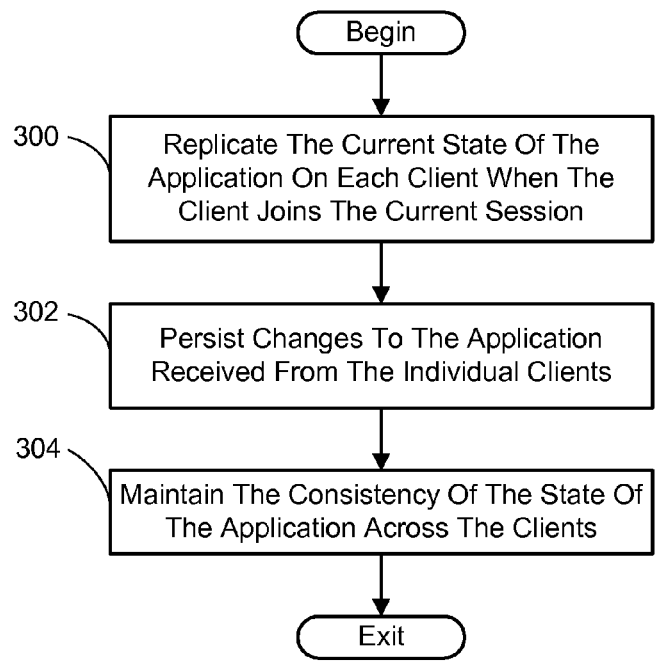
FIG. 3 is a flow diagram generally outlining one embodiment of a process for facilitating collaborative interaction in an application-independent manner between users of a web application respectively running on a client computer associated with each user from the perspective of a server which is in communication with each client.

In general the present persistent collaborative framework for interactive web applications operates by providing persistence and sharing of arbitrary application-defined objects across the group of clients, while at the same time maintaining a consistent state among all clients. From the server's perspective the foregoing falls into three general tasks, as shown in FIG. 3. In the first task, the server replicates the current state of the application on each client at the time that client joins the current session (300). In the second task, the server persists changes to the application states received from the individual clients (302). And in the third general task, the server maintains the consistency of the state of the application across the clients (304). The sections to follow will more fully describe how these tasks are implemented.

2.2.1 Server-Client Communication Protocol

Before the server-client operations can be described, the communication protocol between the server and clients should be understood. In general, the present framework employs tuples to communicate and a property-based scheme to define the state of the application and the updates. For the purposes of this description, a tuple is defined as an ordered list of N elements, each of a prescribed type. Given an initial state of the application at the beginning of the session which is the same across the clients and defined by a collection of objects, any valid application state can be expressed as a set of property-value updates applied to the objects of the initial state. This follows because the state of a web application consists of HTML elements and scripting language objects. In addition, any update to the application can be expressed as a change to the property-value of an object.

Figure 4:
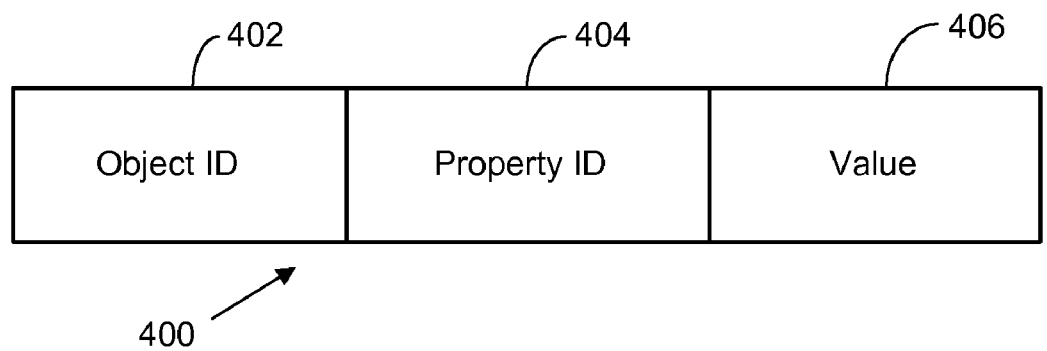
FIG. 4 is a diagram representing a tuple defining a current value of a property of an object of the web application.

The aforementioned tuples provide the property-value updates. As shown in FIG. 4, each tuple 400 includes an element providing the object ID 402, an element that provides the property ID 404, and an element that provides the property value 406. Every time one or more tuples are sent from the client to the server, the aforementioned client identification and session tokens would also be sent. The server would have records of users and the session they are involved in, and so can confirm that the incoming tuples are valid for the identified session. In addition, the server would maintain records of each object (HTML element) involved in a session via its object ID. The objects making up the web application and their object IDs are established by the application. An object in turn is defined by a set of property-value pairs which for each pair identify a property of the object via the property ID and the value assigned of that property. The property IDs are also established ahead of time by the application.

By way of example, assume that the user moves an object to the left. The tuple generated for this update to the application would identify the object affected (via the object ID), the property of the object affected (via the property ID), and the new value of the property (which in this example would be a new X-coordinate value). Now, assume the object ID is "Note-1", the property ID is "style.left", and new value is "100 px". The tuple would then be {Note-1, style.left, 100 px}. Since the present framework does not interpret the meaning of property updates, the client application must do so on its own. Thus, in the foregoing example, the application would understands that a {Note-1, style.left, 100 px} tuple means that the style.left property of the object having object ID Note-1 needs to be set to property value 100 px.

2.2.2 Replicating the Application State

Figure 5A:
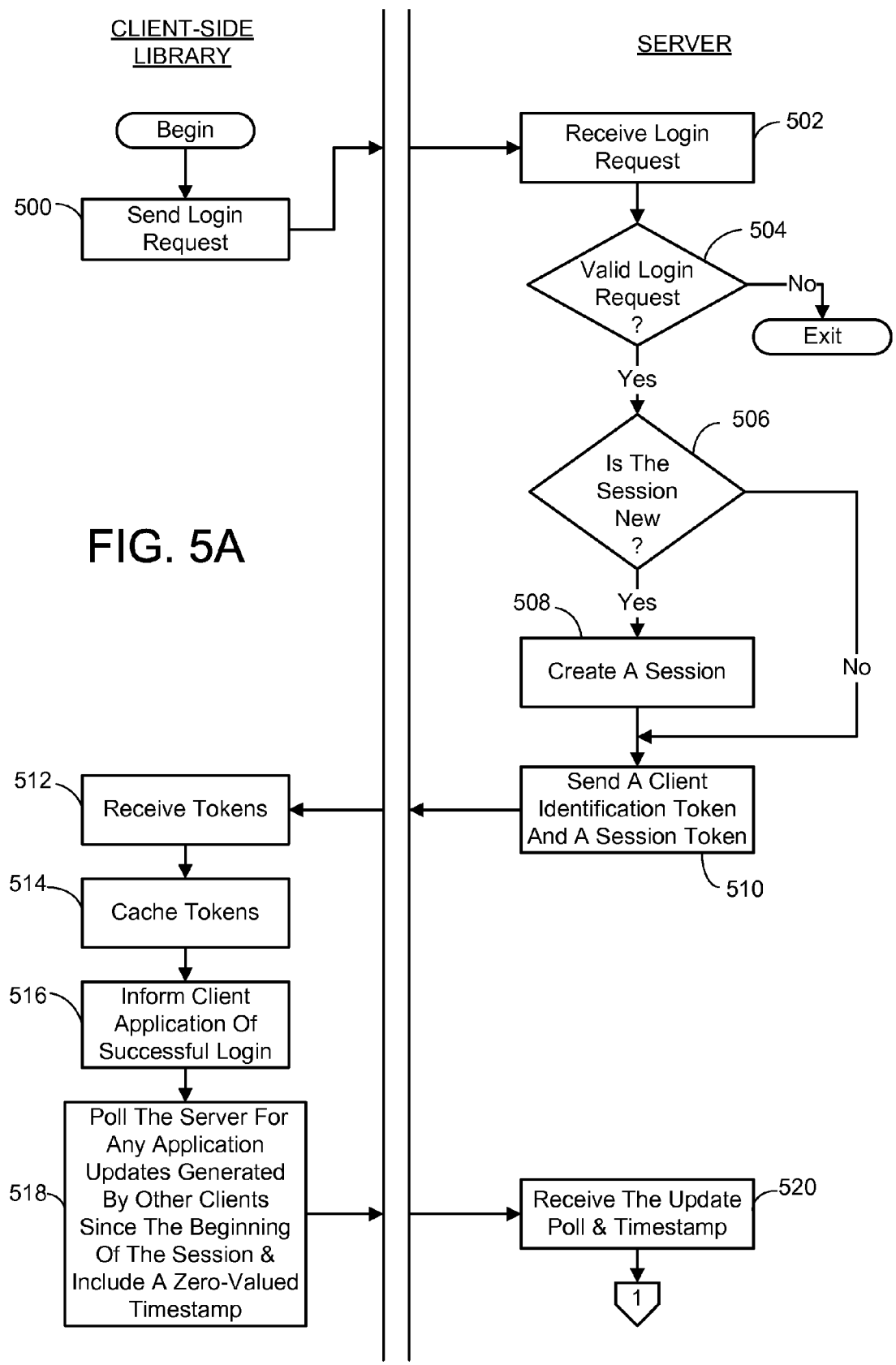
FIGS. 5A-B are a continuing flow diagram generally outlining one embodiment of a process for replicating the current application state for a client joining a session of the application.
Figure 5B:
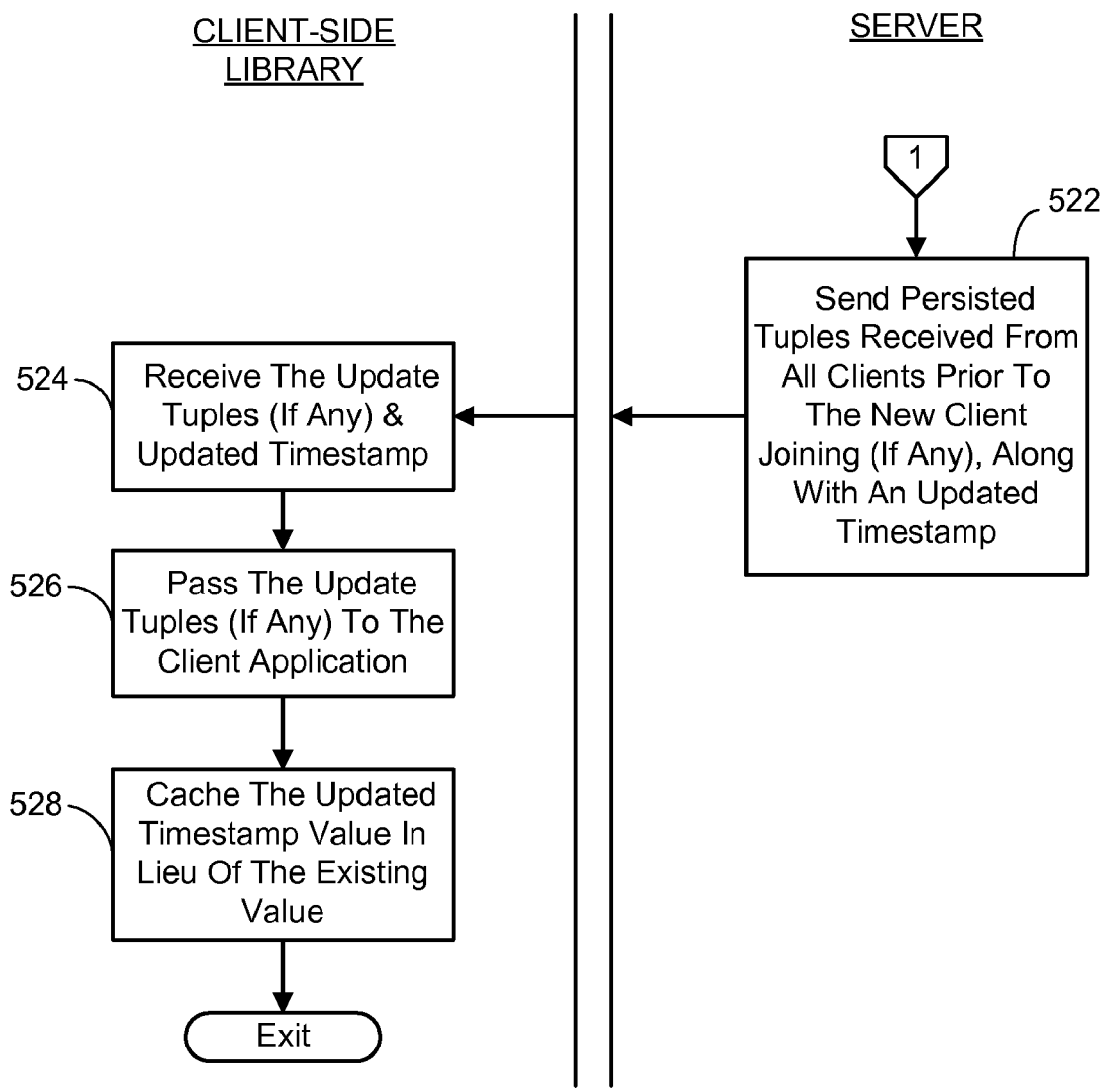
Figure 6:
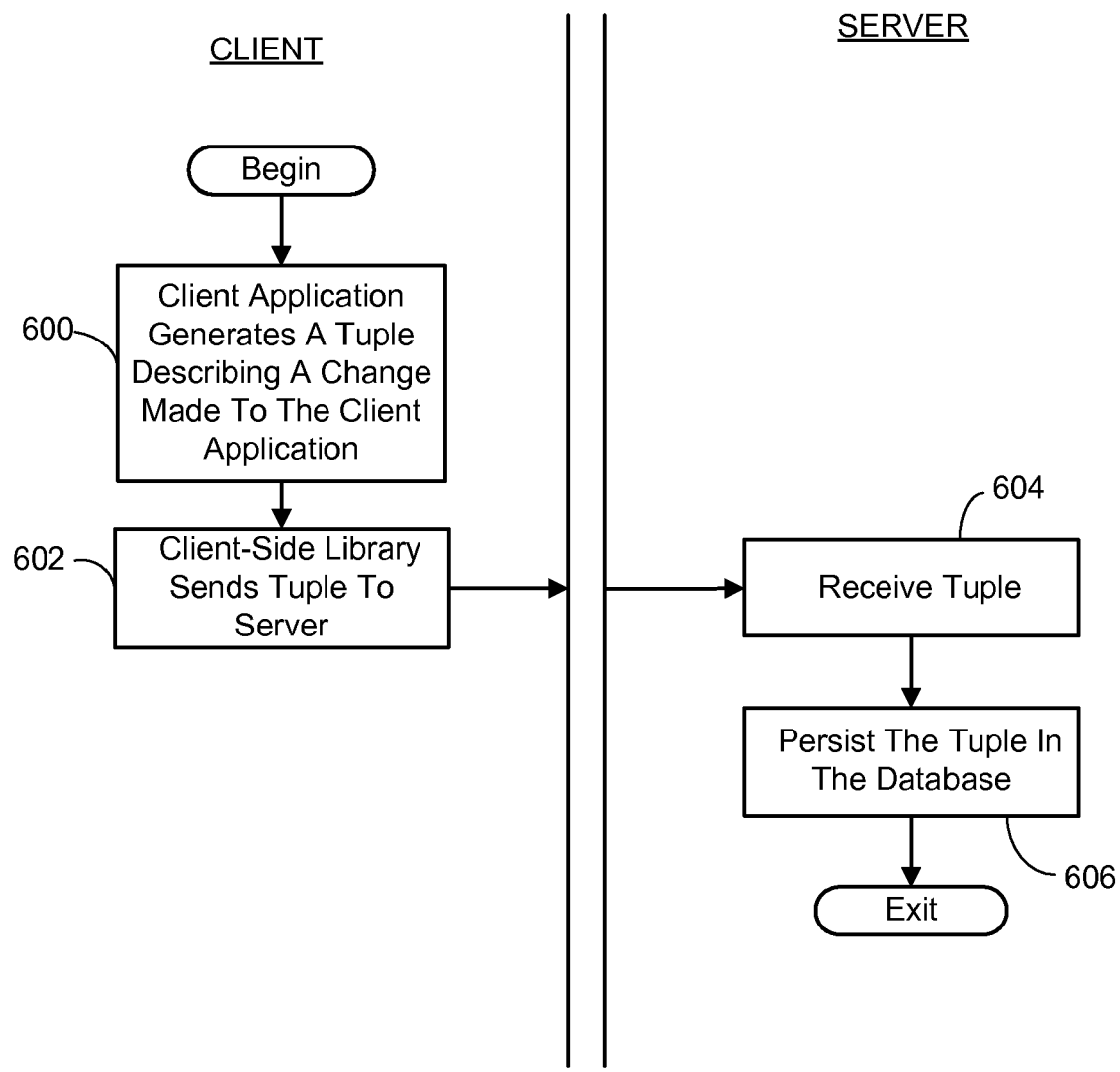
FIG. 6 is a flow diagram generally outlining one embodiment of a process for persisting tuples defining changes to the values of objects of the application, which are generated by the clients and sent to the server.

As indicated previously, the current state of the application is replicated for each client at the time that client joins the current session of the application. Referring to FIGS. 5A-B, one embodiment of this replication technique begins with a client sending a login request to the server. This entails the user initiating a login procedure via the client application. This can be as simple as the user entering a user name and session name. The user may also be required to enter a password, or more advanced authentication schemes can also be implemented as desired. The client application then invokes the client-side library to send the login request with the foregoing data to the server via the web (500).

The server receives the login request from the client-side library (502) and determines if it is a valid request (504) based on the authentication scheme that is employed. If the request is invalid, the technique ends. However, if the request is valid, it is next determined if the session is new or not (506). In the case where the session is new, the server creates a session (508). In either case, the server returns both a client identification token and a session token to the client-side library (510). The library receives the tokens (512) and caches them (514) for inclusion in future data transmissions to the server. In addition, the client application is informed of the successful login (516).

Next, the client-side library polls the server for any updates generated by other clients that have been stored (i.e., persisted) in the server database since the beginning of the current session, and includes a zero-valued "last sync timestamp" (518). It is noted that whenever the client-side library polls the server for updates, it includes the last sync timestamp (as well as the client identification and session tokens). The timestamp is always set to zero when the application is initiated, so when the library polls the server for updates the first time after a successful login, the last sync timestamp has a value of zero.

The server receives the update poll including the zero-valued timestamp from the client-side library (520). In response, the server returns tuples that were persisted in the database for the current session based on updates received from all clients prior to the current client joining (if any), along with an updated value for the last sync timestamp (522). The client-side library receives the property-update tuples (if any) (524) and passes them on to the client application (526). The application implements the tuples to bring it up from its initial state to the current state shared by all the logged-in clients. In addition, the library caches the received timestamp value in lieu of the existing value (528). This new timestamp value will be included in the next update poll, as will be described shortly.

2.2.3 Persisting Changes to the State of the Application

As described previously, the present framework is also employed to persist changes made to the state of the application during a session. In general, this is done each time a change is made to a property of an object, which the application wants to share. More particularly, in one embodiment of the present framework, the following persisting technique is employed each time a local change is made to the client application state of a client during a session. The technique involves the client application generating a tuple describing the change made to the client application state (600). This tuple is then forwarded by the client-side library to the server (602), which receives the tuple (604) and persists it by adding it to the server database (606).

2.2.4 Maintaining State Consistency

As mentioned previously, the present persistent collaborative framework for interactive web applications also maintains the consistency of the state of the application across the clients. In general, this is done by sending persisted tuples generated by one client to all the other clients for implementation by the local client application. In this way, the consistency of the state of the application on each client can be maintained. This also allows each user to not only observe their own changes, but also those of the other users.

Figure 7:
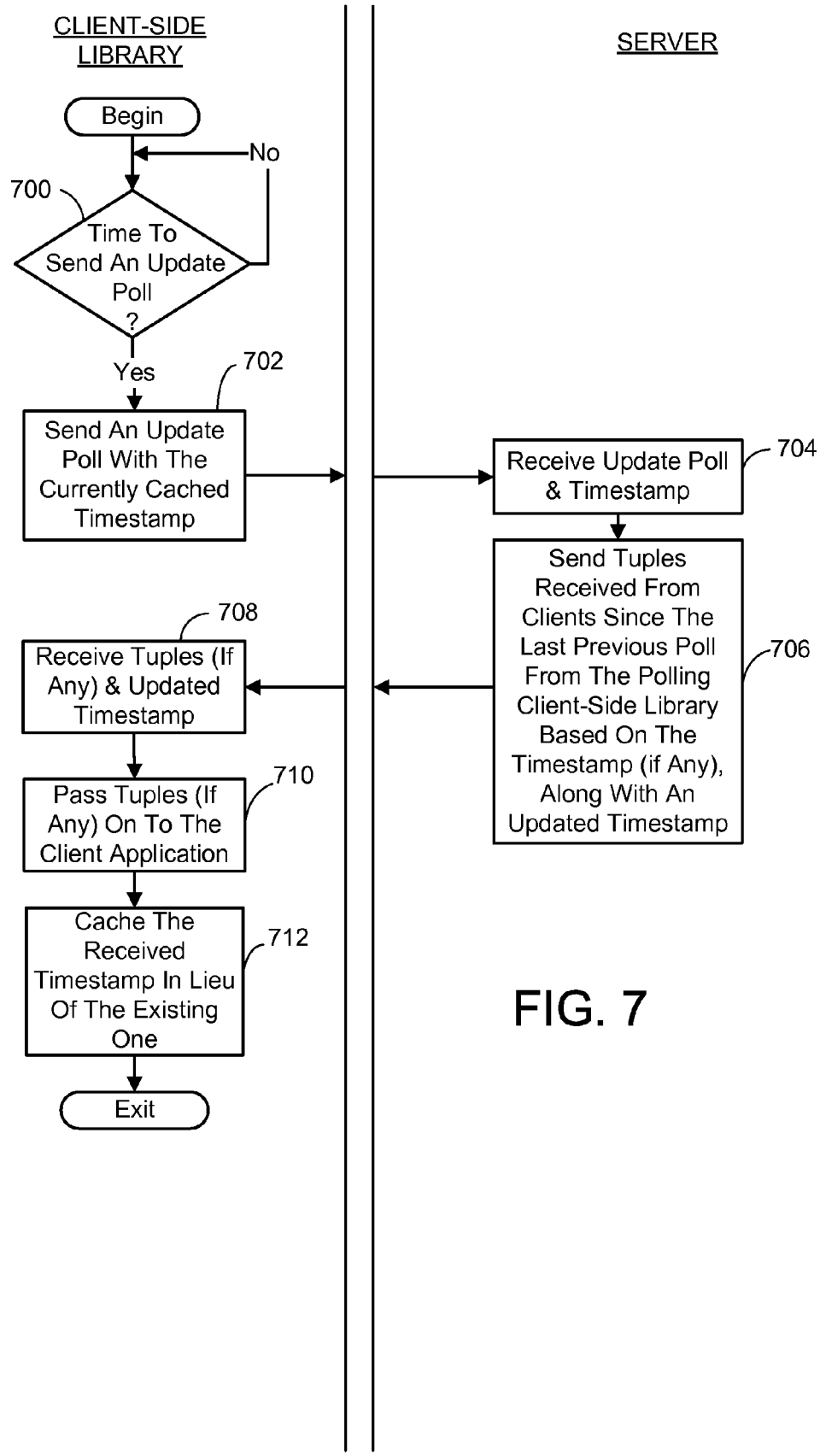
FIG. 7 is a flow diagram generally outlining one embodiment of a process for maintaining consistency in the state of the application across the clients.

More particularly, the state consistency of each client application is maintained in one embodiment of the present framework, as shown in FIG. 7. As stated previously, the client-side library periodically polls the server for updates. Accordingly, the consistency maintenance technique begins with the client-side library determining if it is time to issue an update poll to the server (700). If not, action 700 is repeated. When it is determined that it is time to poll, the client-side library sends an update poll to the server, and includes the currently cached value of the aforementioned last sync timestamp (702). Thus, updates are requested using the same procedure used to request the current state of the application when the client first logged into the session.

The server receives the update poll and timestamp (704). In response, the server sends tuples persisted since the last previous poll from the polling client-side library based on the timestamp, if there are any, along with an updated value for the last sync timestamp (706). Thus, the server only returns tuples representing changes to the state of the application that were not available at the time of the last previous poll.

The client-side library receives the tuples (if any) and the updated timestamp (708), and passes the tuples (if any) on to the client application (710). The application implements the tuples to bring it up to the current state of the application. The library also caches the received timestamp value in lieu of the existing value (712). It is noted that in the case where no update tuples are returned, the server still returns an updated value for the last sync timestamp.

In regard to the part of the technique where the server sends tuples received since the last poll, it is noted that in some embodiments not all tuples received and persisted will be returned. In addition, in some embodiments, additional tuples that were received from another client prior to the time represented by the last sync timestamp, but which were not then available for release, may be included in the returned tuples. Still further, tuples needed to roll the client application back to a previous state before implementing newly received tuples may be included in the returned tuples in some embodiments. These variations will be described in the sub-sections to follow.

2.2.4.1 Server Database Arbitrated Consistency Maintenance

An important issue in collaborative systems is how client applications are kept consistent in the face of simultaneous and sometimes conflicting operations. This is especially important for the present framework because to maintain interactivity, client always perform updates locally first and then send the tuples reflecting the change to the server. Hence, a client application may perform an update locally that conflicts with an update performed locally on another client's application. For example, suppose one user associated with a first client application makes a change to a property "color" of an object "Note-1" to make the property value "red". At the same time, another user associated with a second client application makes a change to the property "color" of object "Note-1" to make the property value "green". As both changes are implemented locally, the application states of these two clients are temporarily different. As per the persistence technique, each client-side library sends tuples reflecting the changes to the server. Thus, the client-side library of the first client sends the tuple {Note-1, color, red}, and the client-side library of the second client sends the tuple {Note-1, color, green}. These tuples will necessarily arrive at the server and be persisted at different times. As they involve the same property of the same object, a potential conflict arises.

In one embodiment of the present framework, this potential conflict is resolved by making the server database the arbitrator. Thus, the order in which property updates are stored in the database will decide which of two (or potentially even more) tuples will be implemented. The rules used to make this determination can vary as desired. For example, a "last write wins" policy could be adopted. This policy dictates that when an update poll is received from a client-side library and two or more update tuples concerning the same property of the same object have been received and persisted since the last poll by that library, the last tuple persisted is designated to be implemented in lieu of the others. The conflicting tuple that is to be implemented in lieu of the others is returned to the polling client-side library. It is noted that other, perhaps more complex, conflict resolution policies could be adopted instead.

By way of example, assume in the previous scenario that the server enforces a last write wins policy. Also assume that the {Note-1, color, red} was persisted first, and the {Note-1, color, green} second, and that both were persisted after the time represented by the last sync timestamp cached in the client-side libraries of both clients. The next time the two libraries poll, the server will apply the last write wins policy to bring the client applications in sync. Thus, when the client-side library of the first client polls for updates, the server sends back only the tuples that were persisted after the time represented by the last sync timestamp, and which were not generated by the polling client-side library, per the general maintenance consistency technique. However, in addition, as the {Note-1, color, green} tuple generated by the second client application was persisted last, it will be implemented in lieu of the {Note-1, color, red} tuple sent by the polling client-side library of the first client. As a result, the {Note-1, color, green} tuple will be returned to the polling client-side library along with an updated value of the timestamp. The client application of the first client would implement the {Note-1, color, green} tuple, thus bringing the state the Note-1 object into line with the second client application's Note-1 object. In contrast, when the client-side library of the second client polls for updates, the server again sends back only the tuples that were persisted after the time represented by the last sync timestamp, and which were not generated by the polling client-side library. However, this time, as the {Note-1, color, green} tuple is to be implemented in lieu of the {Note-1, color, red} tuple, and the {Note-1, color, green} tuple was sent by the polling client-side library of the second client, neither of the conflicting tuples is returned. As a result, only an updated value of the timestamp would be returned. As no tuple affecting the color property of the Note-1 object is received by the application of the second client, the current value of "green" implemented when the change was made in the client application would remain unaltered. Thus, the state the Note-1 object would be the same as that in the first client's application and so consistency is maintained.

2.2.4.2 Ordered Execution Consistency Maintenance

A server database arbitrated consistency maintenance approach is sufficient in many collaboration scenarios, such as, for example, when social protocol is sufficient to avoid making conflicting operations or when users take turns in making changes. However, in some scenarios, the prescribed arbitration policy employed by the server may not be appropriate. For example, if the application allows a user to lock an object, then the user who sets the locked property of the object first should, ideally, own the lock. But what if the server imposes a last write wins policy and two users lock the same object concurrently? In such a case, the user whose update is processed second will automatically get the lock, which is the opposite of the desired effect.

In one embodiment, the foregoing situation can be avoided by implementing an ordered execution approach. This approach can be the default approach, or as in tested embodiments, it can be an option requested by the client-side library in an update poll. In general, the ordered execution consistency maintenance approach involves having the server return all the tuples generated by both the polling client-side library and the other clients, and persisted since the last previous update poll of a polling client-side library. In addition, the server would provide these tuples in the order in which they were received. The client application would then implement the tuples in the order they were received from the server.

Figure 8:
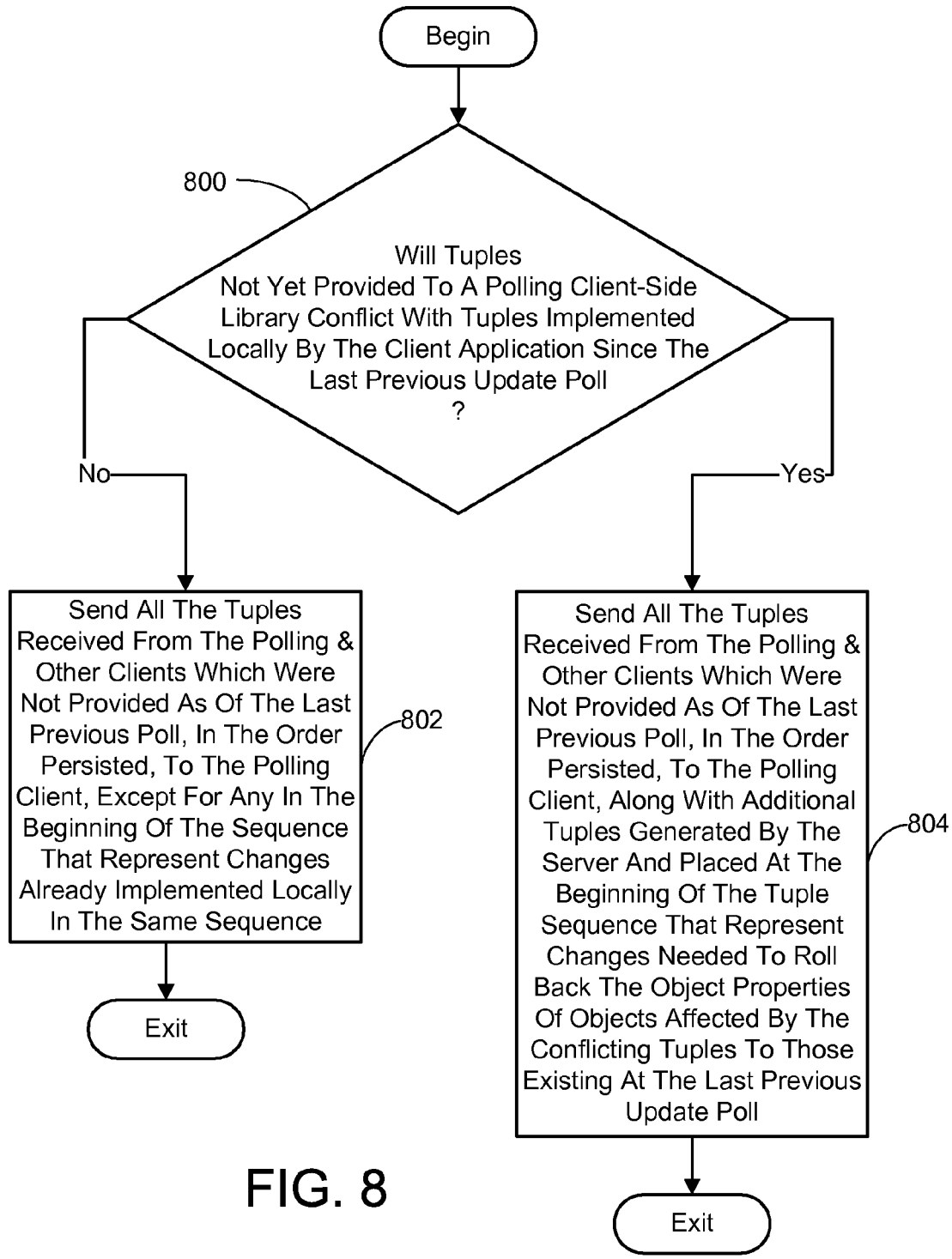
FIG. 8 is a flow diagram generally outlining one embodiment of a process for the server to provide tuples in response to an update poll from a client which can involve including tuples for rolling back a change made to an application object property by a client.

It is noted, however, that since the order in which a client executes the update tuples matters, any updates a client has previously executed locally in the wrong order must be rolled-back before it can correctly process updates in the right order. This can be accomplished by the server adding tuples to those provided in response to a poll that roll-back the state of the application to the point before the ordered sequence of tuples begins. More particularly, referring to FIG. 8, in one embodiment this roll-back technique involves the server first determining if tuples not yet provided to a polling client-side library will conflict with tuples implemented locally by the client application since the last previous update poll (800). If not, all the tuples received from the polling client-side library and the other clients which were not provided as of the last previous poll are sent in the order persisted to the polling client-side library, except for any in the beginning of the sequence that represent changes already implemented locally by the client application in the same sequence in response to user inputs (802). However, if it was determined that tuples not yet provided to the polling client-side library will conflict with tuples implemented locally by the client application since the last previous update poll, then all the tuples received from the polling client-side library and the other clients which were not provided as of the last previous poll are sent to the polling client-side library in the order persisted. In addition, tuples generated by the server and placed at the beginning of the tuple sequence that represent changes needed to roll back the object properties of objects affected by the conflicting tuples to those existing at the last previous update poll are also provided (806).

By way of example, assume a first and second client application states are consistent with each other as of a last update poll by each. Now, assume the users of both client applications concurrently lock object "Note-1", which was previously unlocked. Both client applications would apply the respective locks locally. Further assume that the client-side library of the first client sends a tuple describing the Note-1 lock to the server, where it is stored in the database first. Thus, the Note-1 lock implemented locally in the second client application should not have been awarded. This situation is remedied after the next poll by each respective client-side library. When the first client-side library's poll is processed by the server, the response, as regards the locked object, only includes a tuple describing the second client application's lock. The reason for this is that the first client application has locally executed the lock in favor of that client. As this change would be at the beginning of the tuple sequence, it is eliminated from the response as it would be redundant. In the response to the update poll from the client-side library of the second client, on the other hand, the server would add tuples needed to roll-back the state of the second client's application to what existed at the last previous poll to the beginning of the tuple sequence. The reason for this is that the second client's application has applied a Note-1 lock in its favor before the first client's application lock, which is not the order in which they are were stored in the database. Thus, the roll-back tuples reset the lock property value of the Note-1 object to the unlocked condition that existed at the last previous update poll. Then, the second client's application can correctly execute the lock update tuples in the correct order, first from Client 1 and then from Client 2. The net result of the foregoing is that both client application states are consistent with each other once again as the first client application's lock is processed first, and then the second client applications lock is processed in that order. It is noted that when the first client application implements the unlock property-update, a tuple describing this change would be sent by the client-side library to the server.

2.2.4.3 Tuple Sequence IDs and Group Designations

In general, the order in which a client application sends requests may not be the order in which the requests are processed by the server. The reason is that the server instantiates a new process to serve each client request (as is typical), and there is no guarantee of the order in which the server will schedule these processes. As a result, there is no guarantee that the property-update tuples will be stored in the database in the order in which they are sent to the server.

To solve this problem, in one embodiment of the present framework, the client-side library assigns a monotonically increasing sequence ID to each request it sends to the server to persist a tuple. The library then includes this sequence ID with a data sent to the server, along with the client identification and session tokens. The sequence IDs are mapped into a global sequence ID on the server, which is used to order the updates from all clients. In this embodiment, the updated last sync timestamp value that the server sends to the client library in an update poll response can be a global sequence ID that marks the stored update up to which the client has been synchronized.

When processing a tuple received from a client-side library, the server instance first checks if the client sequence ID included with the tuple is one unit more than the greatest of the sequence IDs associated with tuples persisted for the client. If so, then it persists the tuple in the server database. If there are no previous tuples stored for the subject client, then the server instance still stores the tuple as the beginning of the sequence for the client. If, however, the client sequence ID included with the tuple is not one unit more than the greatest of the sequence IDs associated with tuples persisted for the client, then additional actions are taken. For example, when the client sequence number is more than one unit greater, the server persists blank entries (called template entries) for each missing tuple in the sequence and also persists the received tuple. The template entries temporarily hold the place of missing tuples in the sequence. When a tuple is received from the same client with a client sequence ID corresponding to a template entry, the template entry is replaced with the tuple. It is noted that the aforementioned global sequence IDs are assigned to each tuple and template entry persisted in the order in which it is persisted. Accordingly, replacing a template entry also includes reassigning the global sequence ID assigned to the template entry to the tuple.

It is noted that if an update poll is received by the server from a client-side library, the tuples returned are affected if there are template entries stored in the database. More particularly, tuples from a client that are persisted in the database and that have a global sequence ID greater than a template entry (indicating a tuple in the global sequence is missing), would be withheld from the tuples returned to a polling client-side library. The withheld tuples would be included in a response to a future update poll once the missing tuple or tuples are received.

Another situation that effects whether persisted tuples are returned in response to an update poll involves tuples received from the same client that represent changes that are part of an inseparable group of changes. For example, a user might move an object in two dimensions at once (e.g., horizontally and vertically). This would result in two tuples being generated—one to change the horizontal position property of the object and another to change its vertical position property. These two tuples should be implemented together to accurately reflect the actual change made by the user. Normally, this is not an issue if the series of tuples forming the group of changes are all provided together in response to an update poll. But, assume the server has processed and persisted only the first of the two updates in the group at the time an update poll is received from the client-side library of a second client. Absent any provisions to prevent it, the second client could receive a tuple representing part of the move in response to the update poll and not receive the tuple representing the rest of the move until after the next update poll. Thus, a move that was intended to occur in one step is seen as a two step move by the polling client. This issue can be resolved with a group designation as will now be described.

In one embodiment of the present framework, the group designation approach is as follows. In general, whenever a series of actions is intended to be performed in order before any other tuples are implemented, the client-side library is invoked to designate the series of tuples as a group. In one version, this is accomplished by the client-side library adding an element to the first tuple of a group that indicates the tuple is the start of a group of tuples. The tuples in the group are then individually sent to the server for persisting in the manner described previously. When the last tuple in the group is generated, the client-side library adds an element that indicates the tuple is the last in the group. The server receives and persists the tuples as a group starting with the tuple having the group start indicator and ending when the tuple having the end group indicator is received. In another version, the start and end group indicators can be implied based on begin and end calls from the client-side library.

When an update poll is received from another client, the server will not send any tuples having a global ID that is greater than that of the earliest tuple in a series of tuples designated as a group until the entire group has been received and persisted. Thus, in the foregoing example situation, the second client does not receive the tuple representing part of the move in response to its update poll. Instead, the client will receive both tuples in response to a future update poll once all tuples in the group are received and persisted by the server. In this way, the tuples can be implemented together by the client application and so the move they represent could be seen in one step.

Figure 9A:
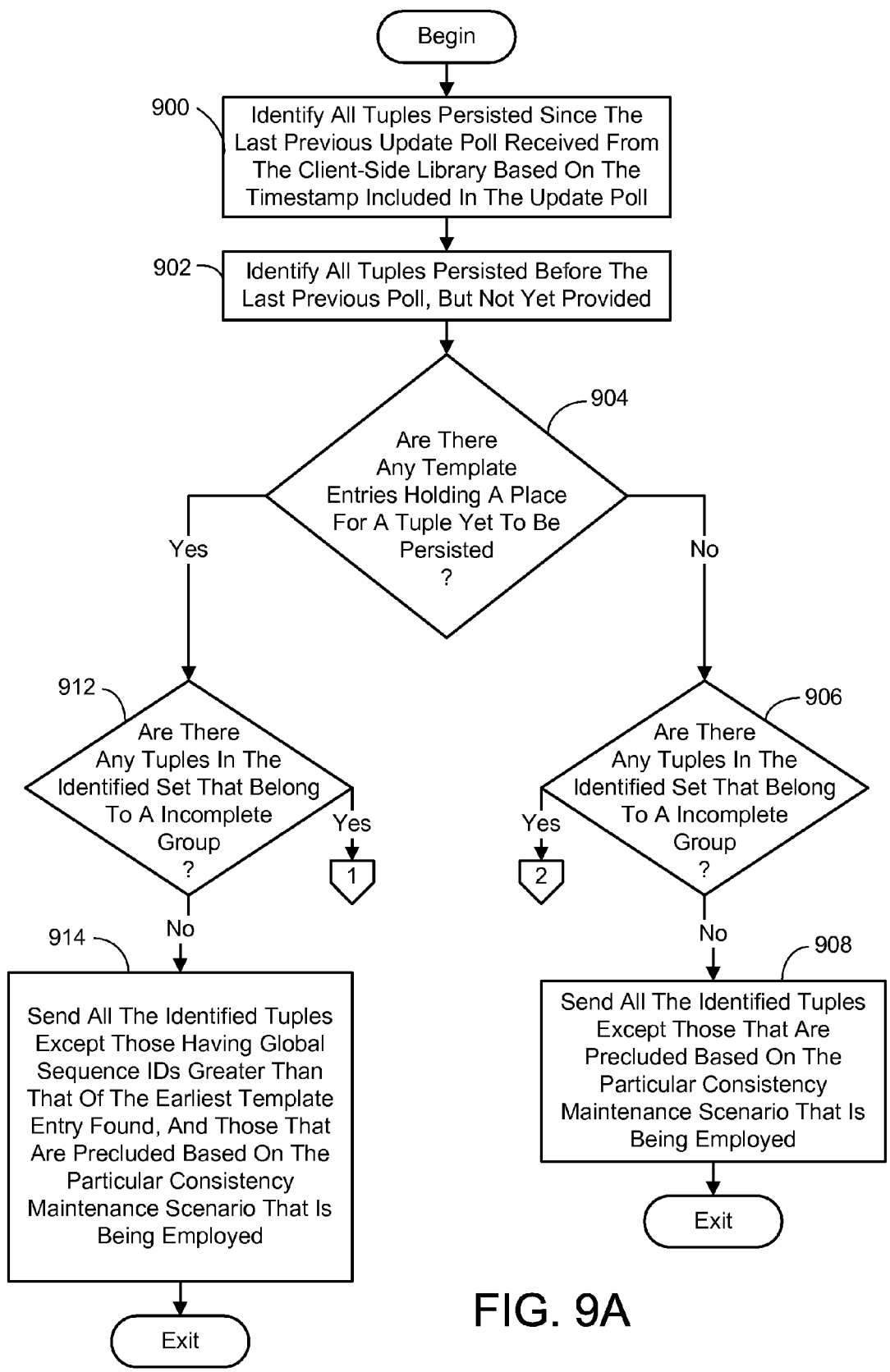
FIGS. 9A-B are a continuing flow diagram generally outlining one embodiment of a process for the server to provide tuples in response to an update poll from a client which can involve withholding out of sequence tuples and tuples that are part of an incomplete group.
Figure 9B:
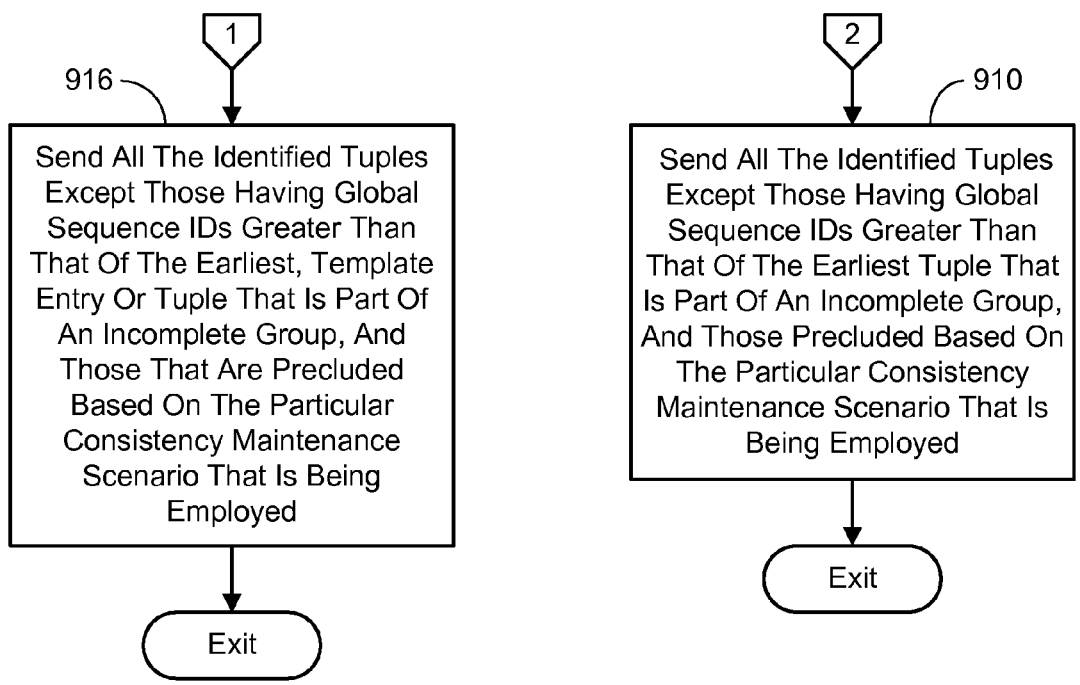

Given the foregoing tuple sequence ID and group designation schemes, the following flow diagram outlines the technique used in one embodiment of the present framework for the server to determine what tuples are to be provided in response of an update poll by a client. Referring to FIGS. 9A-B, when an update poll is received, the server first identifies all the tuples that have been persisted since the last previous update poll from the subject client based on the timestamp included in the received poll (900). In addition, the server identifies all tuples that were persisted before the last previous poll, but which have not yet been provided to the polling client-side library (902). For example, these tuples may include out of sequence tuples and uncompleted group tuples as will be described shortly. It is then determined if there are any template entries in the database (904). If not, it is next determined if there are tuples in the identified set of tuples that belong to an incomplete group (906). For the purposes of this description, an incomplete group is a series of tuples coming from the same client, which have been designated as a group, but for which the last tuple of that group has not yet been persisted by the server. If no incomplete group tuples are found, the server sends all the identified tuples except those that are precluded based on the particular consistency maintenance scenario that is being employed (908). For example, if the server database arbitrated scenario is employed, the server would only send the "winning" tuples as determined using the arbitration policy that is in place. Alternately, if the ordered execution scenario is employed, all the tuples except those at the beginning of the set which were generated by the polling client would be sent (or perhaps additional tuples would be sent if a roll back is required as described previously). If, however, incomplete group tuples are found, then the server sends all the identified tuples except those having a global ID greater than that of the earliest tuple that is part of an incomplete group and those precluded based on the particular consistency maintenance scenario that is being employed (910).

On the other hand, if in action 904 it is determined that there are template entries in the database affecting the set of identified tuples associated with a client, then it is still determined if there are tuples in the identified set of tuples that belong to a incomplete group (912). However, this time if no incomplete group tuples are found, the server sends all the identified tuples except those having a global ID greater than that of the earliest template entry found, and those that are precluded based on the particular consistency maintenance scenario that is being employed (914). Alternately, if incomplete group tuples are found, the server sends all the identified tuples except those having a global ID greater than that of the template entry or incomplete group tuple that has the earliest global ID, and those that are precluded based on the particular consistency maintenance scenario that is being employed (916).

2.2.4.4 Client-Side Library Interim Change Issue

Suppose that after a client-side library polls for updates, but before the update tuples are received from the server, the user enters a change to the client application. In this situation, the poll results become invalid because the interim change has not yet been processed by the server.

In one embodiment of the present framework, the interim change issue is resolved by the client-side library. More particularly, if the client-side library is invoked to generate a tuple in the period between sending out an update poll and receiving the results, it sends the tuple but ignores the poll results. In addition, the library does not update the last sync timestamp with the value provided in the poll results. In this way, the interim change tuple will have been processed by the server by the library's next poll request, and since the timestamp was not updated, all the tuples sent in the ignored poll results will be resent in response to the new update poll.

3.0 Other Embodiments

It should be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for providing an application-independent framework for facilitating persistent, collaborative interaction between users of a web application respectively running on a client associated with each user, wherein each client comprises a client-side library which interfaces with the web application running on the client and communicates with a server, the process comprising using each client to perform the following process actions:
- the client application invoking the client-side library to send a request to the server to log into a session of the web application;
- the client application receiving in response to the request an indication of a successful login;
- the client-side library sending an initial update poll to the server requesting an update to place the application running on the client in a current state;
- the client-side library receiving, in response to the initial update poll, a current state of the application from the server as defined by a group of objects with each object comprising a set of property values, and a timestamp representing when the group of objects was sent;
- the client-side library providing the group of objects defining the current state of the application to the application running on the client for implementation;
- the client-side library caching the timestamp;
- the client application generating and the client-side library sending a tuple describing a change to a property of an object to the server each time such a change is made, whereby said change is implemented locally by the client application;
- the client-side library periodically sending an update poll to the server asking for an update to the state of the application, said update poll comprising the last cached timestamp;
- the client-side library receiving from the server, tuples and an updated timestamp in response to each update poll, wherein each tuple describes a change to a property of an object;
- the client-side library providing each tuple received to the application for possible implementation; and
- the client-side library caching the updated timestamp in lieu of the last previously cached timestamp.

2. The process of claim 1, wherein the process actions of the client-side library receiving tuples in response to an update poll, comprises the actions of:
- receiving all tuples posted to the server or released for distribution since the last previous update poll including those posted by the polling client-side library; and
- providing each tuple received to the application for possible implementation.

3. The process of claim 1, wherein the process action of the client-side library sending a tuple describing a change made to a property of an object to the server each time such a change is made, comprises an action of including with each tuple, a client sequence ID comprising a sequentially increasing number for each tuple generated by a client application in the order in which it was produced.

4. The process of claim 1, wherein the process action of the client-side library sending a tuple describing a change made to a property of an object in said group of objects to the server each time such a change is made, comprises the actions of:
- including a start of group indicator with a tuple that is the beginning of a group of tuples intended to be implemented together before any other changes are implemented; and
- including an end of group indicator with a tuple that is the end of the group of tuples intended to be implemented together before any other changes are implemented, wherein the tuple including the end of group indicator is sent after all the other tuples in the group have been consecutively sent to the server.

5. The process of claim 1, wherein the process action of the client-side library sending a tuple describing a change made to a property of an object in said group of objects to the server each time such a change is made, comprises the actions of:
- sending a begin call at the beginning of a group of tuples intended to be implemented together before any other changes are implemented; and
- sending an end call at the end of the group of tuples intended to be implemented together before any other changes are implemented.

6. The process of claim 1, wherein the process action of the client application invoking the client-side library to send a request to the server to log into a session of the web application, comprises an action of the client-side library sending a users name identifying a user of the client and a session name identifying an application session the user wants to join.

7. The process of claim 6, wherein the session name identifies a new application session the user wishes to initiate.

8. The process of claim 1, wherein the process action of the client-side library sending an initial update poll to the server, comprises an action of including a zero-valued timestamp with the update poll, wherein the zero value of the timestamp indicates to the server that the update poll is the initial update poll from the client-side library.

9. The process of claim 1, wherein the process action of the client-side library receiving, in response to the initial update poll, a current state of the application from the server as defined by a group of objects, comprises an action of receiving tuples, each of which describes a property of an object of the application that is different from the property of that object as it exists in an initial state of the application.

10. A computer-implemented process for providing an application-independent framework for facilitating persistent, collaborative interaction between users of a web application respectively running on a client computer associated with each user, the process comprising using a server to perform the following process actions:
- receiving a request from each client to log into a session of the web application, said request comprising a name identifying the session the client is requesting to join;
- determining if the request is valid and from an authorized client;
- upon the determining that the request is valid and from an authorized client, determining if the session in the request is new,
- upon the determining that the session is new, creating a session,
- sending a client identification token and session token to each client requesting to log into the session, wherein the client identification token uniquely identifies the client and the session token identifies the session, and wherein both tokens are to be included in all communications from the clients to the server;
- receiving an initial update poll from each client logged into the session requesting update information to place the application running on the client in a current state;
- sending in response to each initial update poll,
  - tuples defining the current state of the application upon the determining that the session is not a newly created session, wherein the application is characterized as a group of objects with each object comprising a set of properties, and wherein each tuple defines a current value of a property of an object of the application, and
  - a timestamp representing when the tuples defining the current state of the application were sent to the client;
- receiving tuples from at least one client, wherein each tuple defines a new value for a property of one of the objects;

persisting each tuple received;
receiving an update poll from at least one of the clients along with the last timestamp provided to that client, wherein the update poll requests updating tuples; and
providing in response to each update poll,
tuples persisted, after the time represented by the received timestamp, or which were not previously sent to the polling client but have become available for dissemination, and
a timestamp representing when the tuples provided in response to an update poll were sent to the client.

11. A computer-implemented process for providing an application-independent framework for facilitating persistent, collaborative interaction between users of a web application respectively running on a client computer associated with each user, the process comprising using a server to perform the following process actions:
replicating a current state of the application on each client at the time the client joins a session of the application, wherein the current state of the application is defined by a group of objects with each object comprising a set of property values;
persisting changes to the application states received from the individual clients, said persisting comprising,
receiving a tuple from one of the clients describing a change made to a property of an object in said group of objects, wherein a tuple is received each time such a change is made, and
persisting each tuple received; and
maintaining the consistency of the state of the application across the clients, wherein each client comprises a client-side library which interfaces with the client application and communicates with a server, and wherein said maintaining comprises,
receiving an update poll from the client-side library of a one of the clients requesting an update to the state of the application, and including a timestamp provided to the client-side library with the response to the last previous update poll, wherein the timestamp indicates when the response to the last previous update poll was sent to the client, and
providing persisted tuples not provided to the polling client-side library the last previous time the polling client-side library was sent an update, as determined from the timestamp, to the polling client-side library along with an updated timestamp; wherein
said replicating, persisting and consistence maintenance are accomplished independent of the application.

12. The process of claim 11, wherein the process action of replicating a current state of the application, comprises the actions of:
receiving an initial update poll from each client when the client joins the session; and
transferring the property values of the objects comprising the current state to each client in response to the initial update poll, along with a timestamp identifying when the property values were transferred.

13. The process of claim 1, wherein the process action of providing persisted tuples, comprises the actions of:
for each tuple persisted,
determining if there is a previously persisted tuple pertaining to the same object property received from any of the clients that has not been sent to the polling client-side library,
designating these tuples pertaining to the same object property as conflicting tuples,
determining if the last persisted conflicting tuple is to be implemented in lieu of a previously persisted conflicting tuple, and if so
designating the last persisted conflicting tuple as the implementable conflicting tuple; and
providing non-conflicting tuples and implementable conflicting tuples not provided to the polling client-side library the last time the polling client-side library received an update as determined from the timestamp to the polling client-side library, along with an updated timestamp.

14. The process of claim 1, wherein each tuple comprises a client sequence ID associated therewith comprising a sequentially increasing number for each tuple generated by a client application in the order in which it was produced, and wherein the process action of persisting each tuple received comprises the actions of:
determining if the sequence ID included with the received tuple is one unit more than the greatest of the sequence IDs associated with tuples persisted for the client sending the received tuple;
upon the determining that the sequence ID included with the received tuple is not one unit more,
persisting a template entry for each missing tuple in the sequence between the tuple having the greatest of the sequence IDs associated with tuples persisted for the client and the received tuple, if the template entry for the missing tuple does not already exist, wherein said template entry holds a place a missing tuple,
determining if the received tuple has a sequence ID corresponding to a missing tuple,
upon the determining that the received tuple has a sequence ID corresponding to a missing tuple, persisting the received tuple in place of the template entry associated with the missing tuple,
upon the determining that the received tuple does not have a sequence ID corresponding to a missing tuple, persisting the received tuple,
upon the determining that the sequence ID included with the received tuple is one unit more, persisting the received tuple; and
assigning a global sequence ID comprising a sequentially increasing number to each tuple and template entry persisted in the order in which it was persisted, and reassigning the global sequence ID assigned to a template entry to a missing tuple persisted in its place.

15. The process of claim 14, wherein some tuples generated by a client application comprise a tuple group, and wherein the process action of providing persisted tuples, further comprises the actions of:
designating each tuple persisted which comprises a part of a tuple group, as group tuple;
providing to the polling client-side library, the tuples persisted since the last previous time the polling client-side library requested an update or persisted but not previously provided, except those having a global sequence ID greater than the earliest global sequence ID assigned to any template entry or any group tuple that is part of tuple group for which not all the tuples making up the group have been persisted.

16. The process of claim 15, wherein the process action of designating each tuple persisted which comprises a part of a tuple group, as group tuple, comprises an action of identifying a tuple group as those tuples received from the same client comprising a start of group indicator, an end of group indicator and all tuples received in between.

17. The process of claim 15, wherein the process action of designating each tuple persisted which comprises a part of a tuple group, as group tuple, comprises an action of identifying a tuple group as those tuples received following a begin call from the client-side library of a client and before an end call from the client-side library of the client.

18. The process of claim 1, wherein the process action of providing persisted tuples, comprises the actions of:

determining if persisted tuples not yet provided to the polling client-side library will conflict with tuples implemented locally by the client application of the client associated with the polling library since the last previous update poll by that client;

upon the determining that no conflict will occur, providing to the polling client-side library, persisted tuples not provided as of the client's last previous update poll, in the order the tuples were originally persisted, except for tuples in the beginning of the order that represent changes that were already implemented locally in the same sequence;

whenever it is determined upon the determining that a conflict will occur, providing to the polling client-side library, persisted tuples not provided as of the client's last previous update poll, in the order the tuples were originally persisted, along with additional tuples generated by the server which are added to the beginning of the order which represent changes that roll back the object properties of objects affected by the conflict to those existing at the last previous update poll.

\* \* \* \* \*

UNITED STATES PATENT AND TRADEMARK OFFICE
CERTIFICATE OF CORRECTION

| | |
|---|---|
| PATENT NO. | : 7,624,145 B2 |
| APPLICATION NO. | : 11/620658 |
| DATED | : November 24, 2009 |
| INVENTOR(S) | : Sasa Junuzovic et al. |

It is certified that error appears in the above-identified patent and that said Letters Patent is hereby corrected as shown below:

In column 17, line 59, in Claim 13, delete "claim 1," and insert -- claim 11, --, therefor.

In column 18, line 12, in Claim 14, delete "claim 1," and insert -- claim 11, --, therefor.

In column 19, line 7, in Claim 18, delete "claim 1," and insert -- claim 11, --, therefor.

In column 20, line 6, in Claim 18, before "upon" delete "whenever it is determined".

Signed and Sealed this
Tenth Day of May, 2011

David J. Kappos
*Director of the United States Patent and Trademark Office*